United States Patent [19]
Zbikowski et al.

[11] Patent Number: 5,878,410
[45] Date of Patent: Mar. 2, 1999

[54] FILE SYSTEM SORT ORDER INDEXES

[75] Inventors: Mark J. Zbikowski, Woodinville; Brian T. Berkowitz, Bellevue; Kyle G. Peltonen, Issaquah, all of Wash.

[73] Assignee: Microsoft Corporation, Redmond, Wash.

[21] Appl. No.: 714,799

[22] Filed: Sep. 13, 1996

[51] Int. Cl.$^6$ .................................................. G06F 17/30
[52] U.S. Cl. ...................... 707/2; 707/3; 707/7; 707/200
[58] Field of Search ................... 707/2, 3, 4, 5, 707/6, 7, 200, 1

[56] References Cited

U.S. PATENT DOCUMENTS

| | | | |
|---|---|---|---|
| 4,633,393 | 12/1986 | Rundell | 364/200 |
| 4,760,526 | 7/1988 | Takeda et al. | 364/300 |
| 5,179,717 | 1/1993 | Sato et al. | 395/800 |
| 5,388,257 | 2/1995 | Bauer | 395/600 |
| 5,398,338 | 3/1995 | Yoshida et al. | 395/600 |
| 5,404,510 | 4/1995 | Smith et al. | 395/600 |
| 5,428,774 | 6/1995 | Takahashi et al. | 395/600 |
| 5,428,778 | 6/1995 | Brookes | 395/600 |
| 5,551,019 | 8/1996 | Izawa et al. | 395/600 |
| 5,563,997 | 10/1996 | Fisher | 395/148 |
| 5,579,515 | 11/1996 | Hintz et al. | 395/607 |
| 5,640,554 | 6/1997 | Take | 395/607 |
| 5,680,607 | 10/1997 | Brueckheimer | 395/607 |
| 5,745,890 | 4/1998 | Burrows | 707/3 |
| 5,745,898 | 4/1998 | Burrows | 707/101 |
| 5,745,904 | 4/1998 | King et al. | 707/200 |
| 5,765,158 | 6/1998 | Burrows | 707/101 |
| 5,778,364 | 7/1998 | Nelson | 707/6 |
| 5,822,748 | 10/1998 | Cohen et al. | 707/2 |

OTHER PUBLICATIONS

Lee et al. "Adaptive Selection of Access Path and Join Method" IEEE, pp. 250–256.

Leung et al. "Generalized Data Stream Indexing and Temporal Query Processing", IEEE, pp. 124–131.

C.J. Date "An Introduction to Database Systems" Sixth Edition, pp. 712–717, Jan. 1995.

Primary Examiner—Paul V. Kulik
Assistant Examiner—Michael J. Wallace, Jr.
Attorney, Agent, or Firm—Leydig, Voit & Mayer, Ltd.

[57] ABSTRACT

A system and method for returning a sorted result set of information corresponding to files in a file system that have properties which match user query criteria. A view index of files sorted by at least one property common to those files is provided. The view index may be synchronously or asynchronously updated as files are changed. Upon receipt of query requesting a result set of files corresponding to properties in the query criteria, the view index is compared to determine if the properties are maintained in an order that corresponds to the query criteria. If so, the view index is accessed to locate information of files that have the matching properties, and the result set is returned. The view index may be associated with a view description of the identities and order of the properties. The comparison to determine if a view index corresponds with the criteria may then be performed against the view description.

3 Claims, 14 Drawing Sheets

| AUTHOR | TIME STAMP | FILE NAME | NO. OF WORDS | FILE SIZE | PAPER TYPE |
|---|---|---|---|---|---|
| ALMICH | 2319354 | SOFTBALL.MEM | 2154 | 21556 | LETTER |
| ALMICH | 2314257 | PATENT.APP | 5454 | 54456 | A4 |
| ALMICH | 2312449 | LEGAL.BRF | 214 | 64644 | LETTER |
| ALMICH | 2300424 | SOFTBAL2.DOC | 3233 | 1100 | LEGAL |
| ALMICH | 2226885 | MEMO.DOC | 543 | 14471 | LETTER |
| ALMICH | 2214788 | GRAPHIC.DOC | 12223 | 12227 | LETTER |
| JOYNER | 2201257 | SHOES.DOC | 1616 | 16665 | A4 |
| JOYNER | 2490275 | ACCTG.DOC | 214 | 2184 | LEGAL |
| JOYNER | 2364275 | ACCTG.LST | 2154 | 25472 | LETTER |
| JOYNER | 1419684 | MISC.DOC | 544 | 5272 | LETTER |

| PROPERTY SET NAME | PROPERTY ID | SORT INDICATOR | COL. 1 |
|---|---|---|---|
| PROPERTY SET NAME | PROPERTY ID | SORT INDICATOR | COL. 2 |
| PROPERTY SET NAME | PROPERTY ID | SORT INDICATOR | COL. 3 |
| : | : | : | |
| PROPERTY SET NAME | PROPERTY ID | SORT INDICATOR | COL. 6 |

SCOPE = DIRECTORY [C:\WINWORD\DOCS]

VIEW DESCRIPTION 1

FIG. 6B

| PROPERTY SET NAME | PROPERTY ID | SORT INDICATOR | COL. 1 |
|---|---|---|---|
| PROPERTY SET NAME | PROPERTY ID | SORT INDICATOR | COL. 2 |
| PROPERTY SET NAME | PROPERTY ID | SORT INDICATOR | COL. 3 |
| PROPERTY SET NAME | PROPERTY ID | SORT INDICATOR | COL. 4 |
| PROPERTY SET NAME | PROPERTY ID | SORT INDICATOR | COL. 5 |

SCOPE = VOLUME

VIEW DESCRIPTION 2

FIG. 7A

VIEW DESCRIPTION 1

FIG. 7B

VIEW DESCRIPTION 2

| ID | STATUS | DATA |
|---|---|---|
| FILENAME 1 | MODIFIED | LIST OF ORIGINAL PROPERTIES AND VALUES |
| FILENAME 2 | DELETED | LIST OF DELETED PROPERTIES AND VALUES |
| FILENAME 3 | DELETED | LIST OF DELETED PROPERTIES AND VALUES |
| FILENAME 4 | NEW | (NO DATA) |
| ... | ... | ... |
| FILENAME n | MODIFIED | LIST OF ORIGINAL PROPERTIES AND VALUES |

LOOK-ASIDE TABLE

FIG. 12

FILE SYSTEM SORT ORDER INDEXES

FIELD OF THE INVENTION

The invention relates generally to computer systems, and more particularly to a system and method for providing a sorted result set of files in a file system in response to a query.

BACKGROUND OF THE INVENTION

Computer users form queries to determine which documents (i.e., files or objects) maintained in a file system have properties that match one or more properties provided in the query. For expedience, the user typically desires the results of the query to be sorted in some fashion by the query engine, particularly when querying across a large set of documents. If the results of the query comprise a large result set, the sorting process may take a substantial amount of time.

Two conventional types of querying programs may be run. A first type of querying program walks through a set of files by individually opening each file and extracting properties therefrom. If the properties of a given file match the criteria set forth in the query, that file is included in the result set. Although this type of program ultimately locates the matching files, this method is an extremely time consuming process, particularly when dealing with a substantial number of files. If it is desired that the result set be sorted, the process is even lengthier unless the documents are tested in an order that coincidentally matches the sort order (e.g., in alphabetical order).

A second type of querying program runs as a user-level program that accesses a database of properties maintained for a set of documents. Such a database is only updated upon user command, and thus the user must remember to continually update it each time a document is modified otherwise the database will be out of date. Accordingly, this type of querying program works well with a set of documents that is ordinarily static. However, this type of querying program is often unreliable or unworkable with a set of documents that is dynamic, since it is a time consuming, labor intensive and error prone process to continually keep the database current when dealing with changing documents. The problems are particularly evident when multiple users modify the documents, since each such user must be trained to run (and remember to run) the database updating program each time that a user modifies a document. Moreover, like a traditional database, with such conventional database programs the presentation of the result set is limited according to how the database is structured when it is created.

OBJECTS AND SUMMARY OF THE INVENTION

Accordingly, it is an object of the present invention to provide a system and method for rapidly providing a sorted result set of files in response to a query.

It is another object to provide such a system and method that functions desirably with a dynamically changing set of files.

It is a related object to provide a system and method of the above kind that is up-to-date for files in the file system without depending on user commands.

In accomplishing the above objects, it is another object to provide sorted result sets that are customizable.

Yet another object is to provide a system and method as characterized above that is extensible to virtually any types of files regardless of the format of the files and/or the program that creates and utilizes those files.

Briefly, the present invention provides a system and method for returning a sorted result set of information corresponding to files in a file system that have properties which match user query criteria. A view index is provided, having a plurality of files represented therein sorted by at least one property common to those files. Upon receipt of a query requesting a result set, wherein the query includes query criteria corresponding to properties of files in the file system, the view index is compared against the criteria to determine if the properties in the view index are maintained in an order that corresponds to the query criteria. If the properties in the view index are stored in an order that corresponds to the query criteria, the view index is accessed to locate information of files that have properties which match user query criteria. The result set is returned with information therein corresponding to the located files.

In a preferred embodiment, the view index is associated with a view description which has information therein corresponding to the properties (e.g., identities and order). The comparison with the criteria is performed against the view description.

The information corresponding to properties of files in a file system is maintained in the view index. After a file property is modified by an application program, the view index is updated with the modified property information.

Other objects and advantages will become apparent from the following detailed description when taken in conjunction with the drawings, in which:

BRIEF DESCRIPTION OF THE DRAWINGS

FIG. 3 is a chart representing the logical organization of a view index stored in a file system;

FIGS. 6A and 6B are a generalized representations of two view descriptions that store information about respective view indexes associated therewith;

FIGS. 7A and 7B are a representations of exemplary view descriptions;

FIG. 12 is a representation of a look-aside table maintained for asynchronously updating view indexes.

Figure 1:
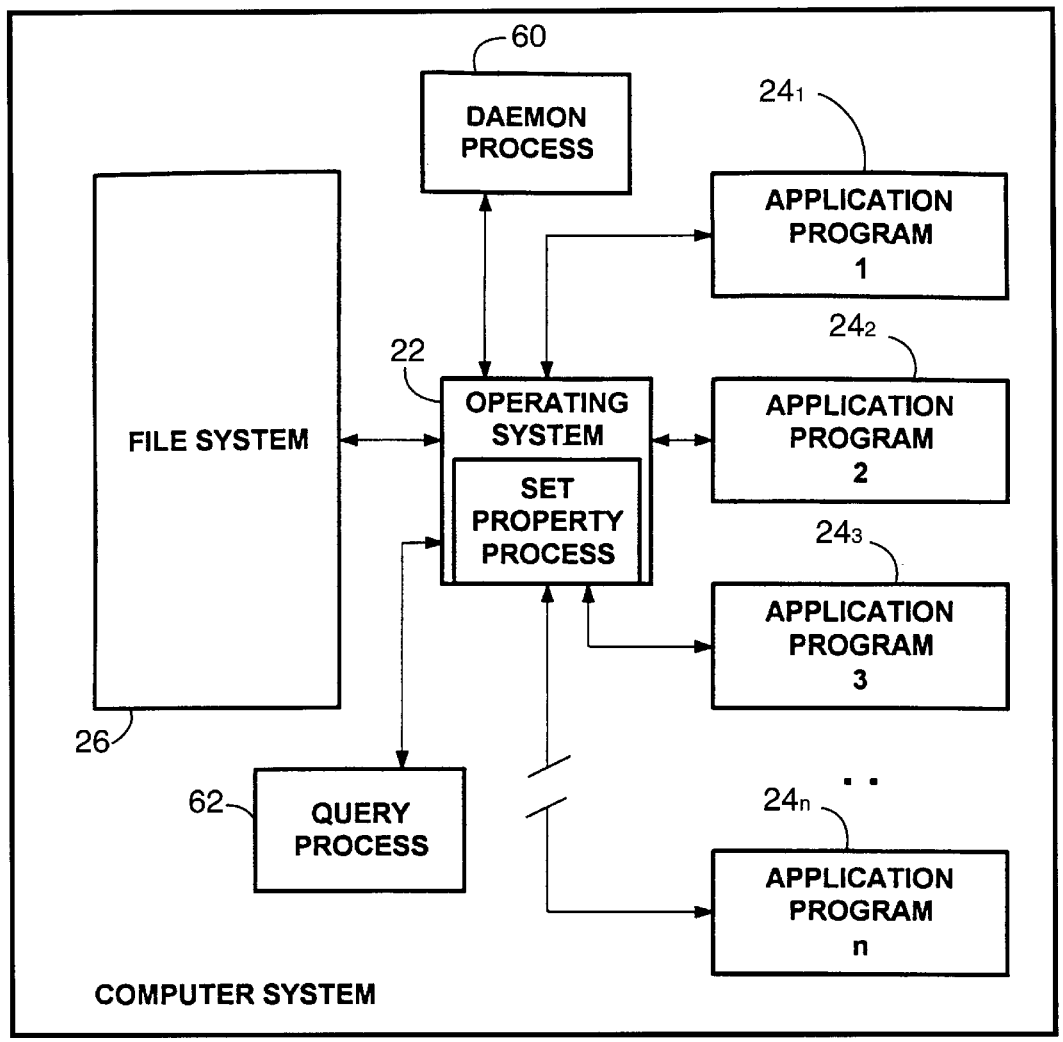
FIG. 1 is a block diagram of a computer system suitable for implementing the invention.

While the invention is amenable to various modifications and alternative constructions, a certain illustrated embodiment thereof is shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Turning to the drawings and referring first to FIG. 1, there is shown a computer system generally designated 20 in which the present invention may be implemented. The computer system 20 includes an operating system 22 and one or more application programs $24_1$–$24_n$. The computer system 20 also includes a file system 26 which facilitates the mass storage of data. Although the present invention may function with virtually any operating system, a preferred operating system is Microsoft Corporation's Windows NT™ operating system.

Figure 2:
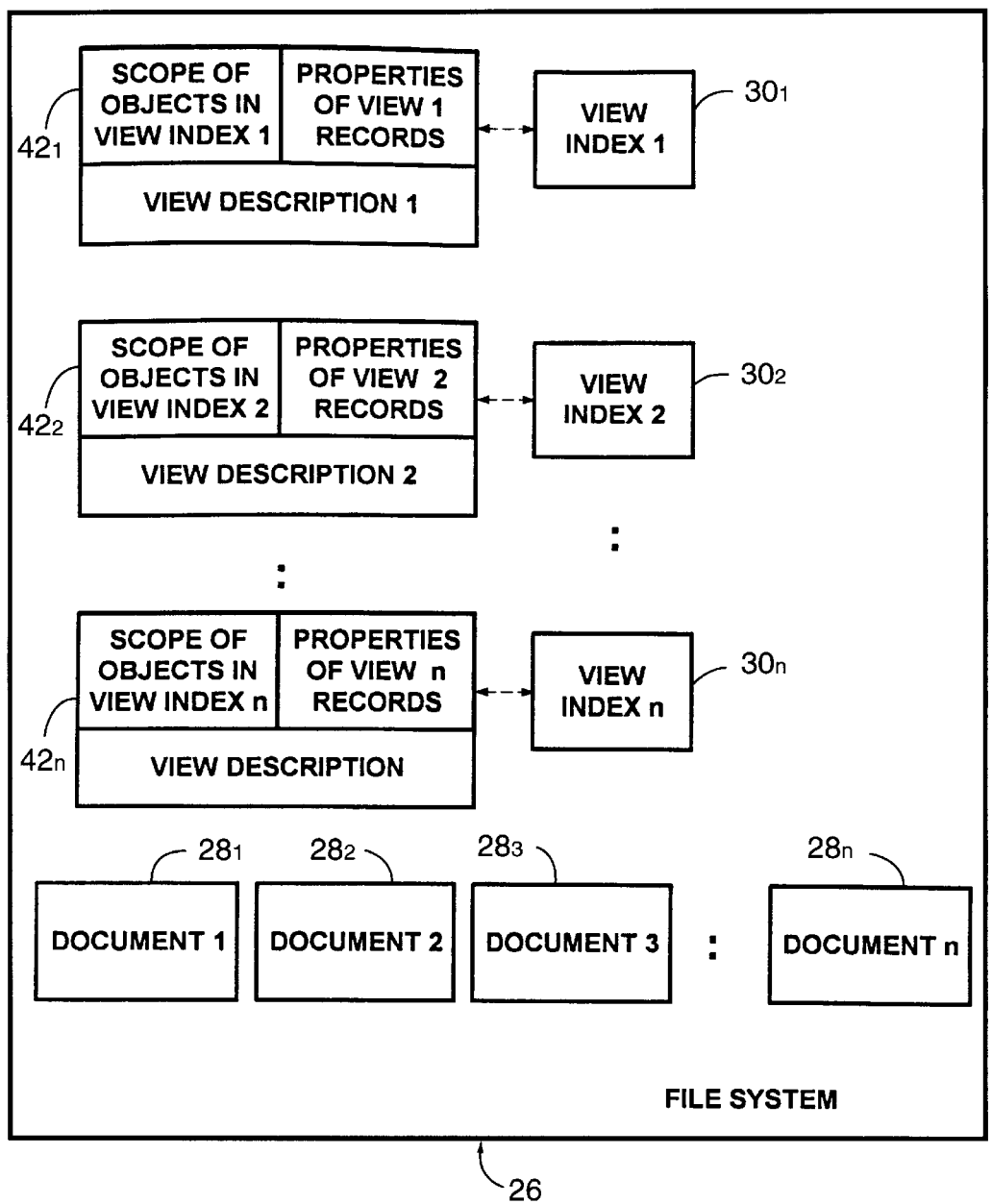
FIG. 2 is a block diagram illustrating a number of files stored in a file system in accordance with a preferred embodiment of the invention.

As shown in FIG. 2, the file system 26 maintains a number of files such as documents $28_1$–$28_n$, ordinarily stored on non-volatile storage media such as a hard disk, floppy disk, tape drive and/or non-volatile memory. As will become apparent, the present invention is not limited to any particular file system, but of course the file system in use should be able to communicate with the operating system. Moreover, it can be appreciated that the term "files" as used herein is intended to represent objects, documents or any other collection of data stored in a mass storage medium.

By definition, each file $28_1$–$28_n$, in a file system 26 has a number of properties associated therewith. For example, a file such as document $28_1$ includes properties assigned by the file system 26 and/or operating system 22, including a filename, timestamp and size. A file (of non-zero length) also includes data, and the data may be considered as having one or more properties. For example, certain documents created by a particular word processing application program may have a common phrase such as "U.S. Patent" stored therein in some recognized format. Thus, those documents possess the property of having the phrase "U.S. Patent" therein, while other documents in the file system 26 would not possess this property.

More sophisticated files (e.g., documents $28_2$ and $28_3$), are structured such that they store (or are linked to a file that stores) certain predefined properties associated therewith. For example, contemporary word processing documents not only store the text and other information that is input by a user during a user session, but may also store the identity of the author, keywords identified by the user, statistical information including the page count, line count, word count, character count and so on. Similarly, spreadsheet files created by contemporary spreadsheet programs are capable of storing such associated information including author, spreadsheet dimensions, width of columns and the like. At least some of these programs store properties and other data in a format that is published, whereby third party programs may glean the various properties from the collection of data that constitutes the file.

As can be appreciated, properties of files fall into logical categories called property sets. For example, file metadata (e.g., file name, timestamp and file size) are properties which may be grouped in a property set named the "File System" property set. Properties inherent to a Microsoft Word™ document (e.g., author, number of words and document title) may be grouped in a property set named the "MS Word" property set. Similarly, properties that result from the creation of a Microsoft Excel™ spreadsheet file (e.g., author and spreadsheet dimensions) may be grouped in a property set named the "MS Excel" property set, and so on. Indeed, any collection of properties may be given a property set name which should be unique to a given file system, although of course there is no requirement that any specific name be assigned.

According to one aspect of the invention, as shown in FIG. 2, the file system 26 provides for the creation and maintenance of one or more view indexes $30_1$–$30_n$ of property information, each of which are intended to correspond to sorted result sets (i.e., "sort orders" that will be returned) for frequently invoked queries. Although likely-to-be-needed view indexes may be predefined for user convenience, the user is provided with the tools to define custom view indexes based upon queries common to a particular user and the desired presentation of the sorted result sets that will be returned by the query. To create a view index, a special file call to the operating system 22 (and thus the file system 26) specifying the scope and column descriptions is available for application programs.

By way of example, FIG. 3 shows the logical organization of an exemplary view index, e.g., view index $30_1$, comprising six properties which may belong to word processing documents. Logically, the view index $30_1$ may be considered as having a number of rows and columns, where each row corresponds to a file in the file system and each column corresponds to a particular property found in those files. The data entered in the "cell" defined by each row and column is the value of that particular property. As shown in FIG. 3, each view index maintains the same property fields (columns) for all files (rows) in its scope. The properties (columns) that are present in a given view index may be arbitrarily chosen by a user from all available properties of a file, and not limited to any particular combination or number.

Thus, as shown in FIG. 3, row $32_1$ contains selected properties for the file named "SOFTBALL.MEM", row $32_2$ contains selected properties for the file named "PATENT.APP", and so on. In this view index $30_1$, the properties stored are AUTHOR (column $34_1$), TIME STAMP (column $34_2$) FILE NAME (column $34_3$), NO. OF WORDS (column $34_4$), FILE SIZE (column $34_5$) and PAPER TYPE (column $34_6$). It should be noted that the properties shown herein are simplified in that, for example, the time stamp column $34_2$ may actually be divided into separate date and time-of-day columns, the author column $34_1$ into last name, first name and middle initial columns, the file name column $34_3$ into separate name and extension columns, and so on.

Significantly, as shown in FIG. 3, the particular view index $30_1$ is not limited to being sorted by the file names therein, but instead has been created by the user so as to be first sorted (primary sort) by the property "AUTHOR" in ascending order. The TIME STAMP property, sorted in descending order, (most recent time first with monotonically increasing time stamps), has been designated as a secondary sort order when the author's name (e.g., JOYNER) in two or more rows is the same in the AUTHOR column. In other words, when two or more files have the same author, those files are ordered in the view index $30_1$ according to their time stamp, most recent time stamp first. The other properties have been left unsorted in this particular view index.

As can be appreciated, virtually any combination and number of properties may be present in a particular view index, and any number of view indexes $30_1$–$30_n$ may be present in a file system. However, each view index comes with a cost in that each additional view index takes up storage space, and, as described in more detail below, may increase the amount of time taken to find a view index that is compatible with a query, if any. Accordingly, it is expected that view indexes will be created by users for the users' most commonly recurring queries, although this is not necessary to the present invention.

To be useful, it is presumed that at least one of the columns in a view index will be sorted, however this is not a requirement. In the exemplified view index $30_1$ of FIG. 3, the user has chosen this particular organization to maintain property information on files sorted first by author, (alphabetically), and then by time stamp, (in reverse numerical order), along with the other property information. For retrieval efficiency, sorted properties are preferably located before unsorted properties in a view index.

According to an important aspect of the invention, when the user provides a query effectively asking for a result set containing "all documents authored by ALMICH, most recent first, showing time stamp, file name, number of words, file size and paper type," the query engine first investigates information about the view index or indexes present in the file system. The information about a view index is maintained in an associated view description, described below. If a compatible view index is found, then the data matching the criteria is extracted from that view index and placed in the sort-ordered result set. As can be appreciated, this is extremely fast relative to conventional programs that individually open and read the files themselves for matching properties, since with view indexes the property data is already organized in contiguous blocks of sorted information. The various files do not have to be individually tested, nor do the matching files have to be sorted.

Moreover, a view index such as view index $30_1$ shown in FIG. 3 is compatible with queries having search criteria that does not directly correspond to all of the properties stored in a view index. For example, if the query requested all documents authored by Joyner identified by their file name (unsorted), the same view index $30_1$ is able to provide this subset information. If the query requested all documents authored by Joyner sorted by file name, this particular view index $30_1$ may still be useful, though not optimal, because the query engine would have to perform a sort by filename. Nevertheless, even with an additional sort step the above process may provide efficiency improvements over processes that must walk though each file individually and extract the author's name therefrom in order to locate those files having the matching property.

Figure 4:
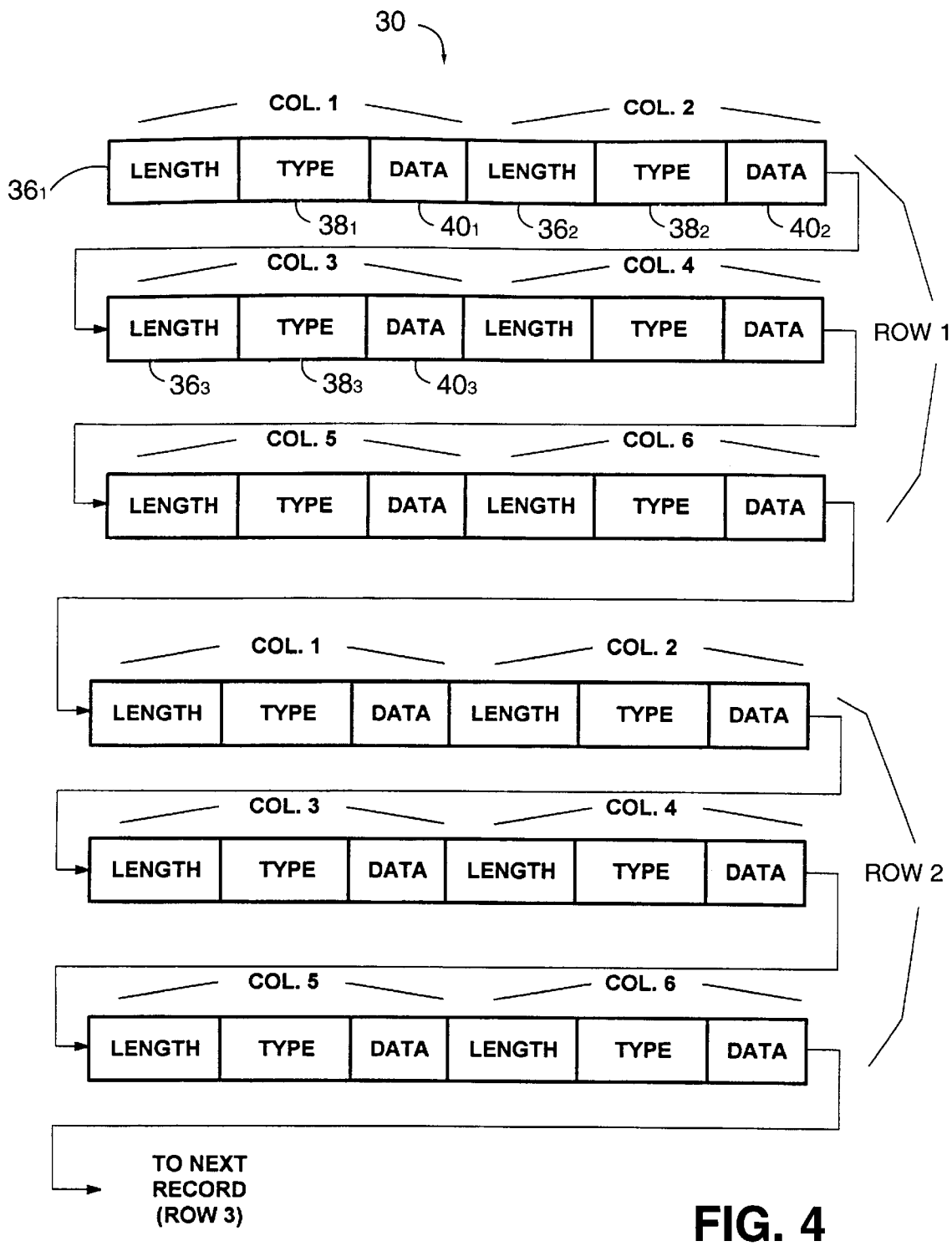
FIG. 4 is a generalized representation of a format suitable for storing information in a view index.
Figure 5:
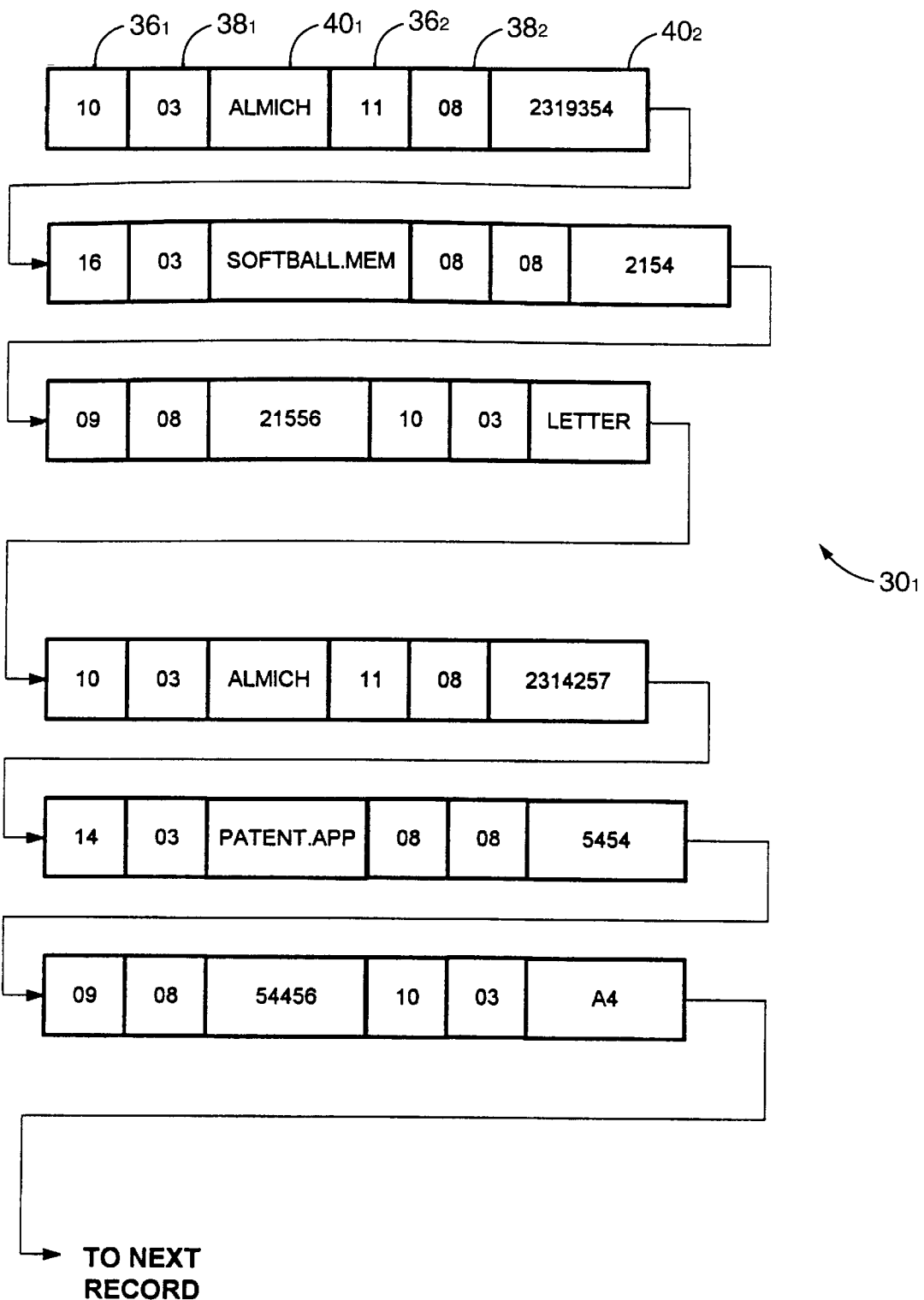
FIG. 5 is a representation of the how the exemplary information stored in the chart of FIG. 3 is stored according to the format of FIG. 4.

As shown in FIG. 4, the property information for each property entry in a view index such as view index $30_1$ is stored in a format comprising a length field (e.g. $36_1$), followed by a type indicator field (e.g., $38_1$) which specifies the type of data stored, followed by the data field (e.g., $40_1$). As shown in FIG. 5, wherein representative values corresponding to the logical view index of FIG. 3 are shown in the actual storage format of FIG. 4, the value in the length field $36_1$ includes the length of all three fields (length plus type plus data). The type indicator field contains a code which represents that the data is either a string, an integer, a bitmap or some other type of data. For example, in FIG. 5, the code 03 in the type field $36_1$ represents string data, while the code 08 in field $36_2$ represents integer data. Finally, the data (as a string such as "SOFTBALL.MEM" or an integer such as 2154) follows its respective code field. If desired, field separators or the like may be used to delineate the fields. However, because the first field is the view index is a length value, if the length and type fields have a known number of bytes (e.g., a doubleword for length and a byte for type), field separators may be unnecessary.

In a preferred embodiment, the view indexes $30_1$–$30_n$ are stored in BTrees within the file system 26. As is well known, a BTree consists of logically sorted data of variable length records, a key to the data and a comparison rule for comparing the keys. BTrees are balanced to provide very efficient mapping between keys and a collection of data. To use a BTree, a BTree interface is provided with a key which it uses in combination with the comparison rule to quickly find the location in the stored data that matches the key. BTree interface commands including add (insert the record information in the key into the BTree location), delete (delete the record that matches the key from the BTree) and read (return the information for the record that matches the key) allow the data to be inserted, deleted, modified (delete old record, add new record) and read in a BTree. As BTrees are well known, for simplicity they will not be described in detail herein. Suffice it to say that they provide an efficient storage mechanism for the view indexes $30_1$–$30_n$ of the present invention.

In order to provide the proper key to a view index $30_1$–$30_n$ for updating and extracting purposes, and in order to locate a compatible view index when querying, as shown in FIG. 2 each view index $30_1$–$30_n$ has a view description $42_1$–$42_n$ associated therewith. Although each view index $30_1$–$30_n$ has a respective view description $42_1$–$42_n$ corresponding thereto, the file system 26 preferably maintains the view indexes $30_1$–$30_n$ and view descriptions $42_1$–$42_n$ as separate objects. One such view index (e.g., $30_1$) and respective view description (e.g., $42_1$) is maintained by the file system 26 for each "sort order" that the user wishes to be maintained. As shown in FIGS. 2 and 6A–6B, each view description $42_1$–$42_n$ comprises two pieces of information. A first piece of information maintained by the view description $42_1$–$42_n$ tracks which documents are associated with the associated view index. For example, with file systems that organize storage media into volumes and directories, a view index (e.g., view index $30_2$) may maintain property information for all documents in a storage volume (FIG. 6B) or (e.g., view index $30_1$) for all documents in a particular directory on that volume (FIG. 6A). An identifier $44_1$ (FIG. 6A) or $44_2$ (FIG. 6B) tracks the scope of the view index and, when necessary, maintains the directory name when the scope is limited to a particular directory, for example, "C:\WINWORD\DOCS" in identifier $44_1$ of FIG. 6A.

As further shown in FIGS. 6A and 6B, each view description $42_1$, $42_n$ also includes a second piece of information that records what information is present in its associated view index and how that information is organized. More particularly, the view description $42_1$ stores which properties are present in the view index $30_1$ and how those properties are ordered in that view. To this end, the view description $42_1$ preferably stores a data structure $46_1$ comprising a series of triplets, wherein each triplet corresponds to one column in the view index $30_1$. Thus, the view description $42_1$ that corresponds to the six-column view index $30_1$ has six triplets $48_{A1}$–$48_{A6}$ stored therein. The view description $42_2$ that corresponds to the five-column view index $30_2$ has five triplets $48_{B1}$–$48_{B5}$ stored therein.

Figures 7A, 7B:
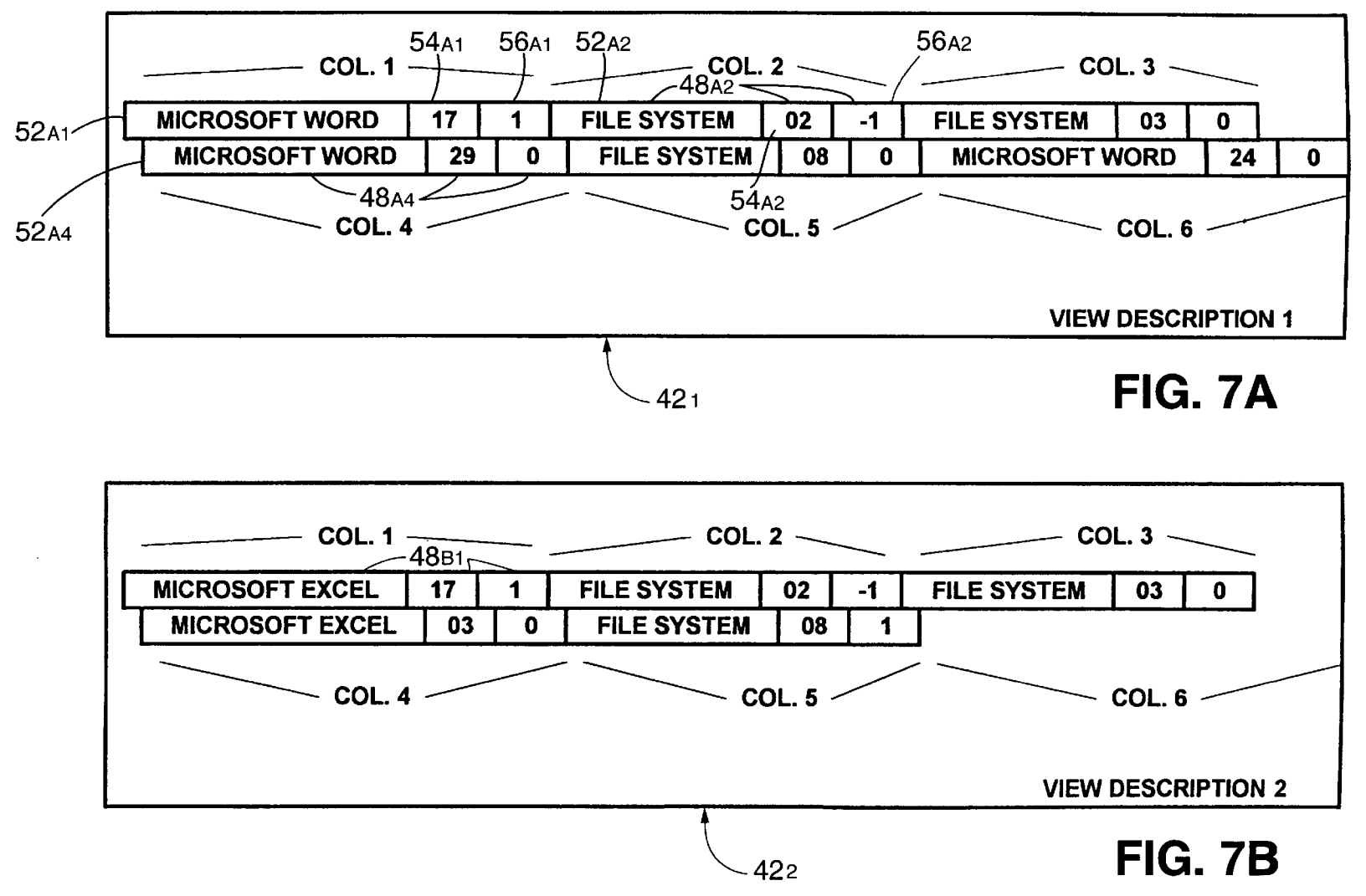

Each triplet contains a first field $52_{A1}$–$52_{A6}$ or $52_{B1}$–$52_{B5}$ that stores the name of the property set to which a property belongs. As shown in FIG. 7A, which further corresponds to the exemplified view index of FIG. 3, the property set name in field $52_{A1}$ to which the AUTHOR property belongs is the MICROSOFT WORD property set. The second field $54_{A1}$ in that triplet is a coded value which identifies the particular property in that set, in this case 17 which represents the "AUTHOR" property. As can be appreciated, each property set may have its own arbitrarily numbered property IDs. Lastly, the third field $56_{A1}$ in the triplet is a sort indicator, indicating whether the properties in the column are sorted in ascending order (1), descending order (−1) or are unsorted (0). Note that these sort indicator values are also arbitrary, and any three unique values will suffice.

Similarly, the second set of triplets $48_{A2}$ in FIG. 7A describes the second column in the logical view index of FIG. 3. Thus, the property set name in field $52_{A2}$ is FILE SYSTEM, with a property ID of 02 in field $54_{A2}$, which, when taken together, indicate that the property in the second column of the view index of FIG. 3 is a time stamp. The third field $56_{A2}$ in the triplet $48_{A2}$ is equal to minus 1, which indicates that the time stamp is sorted in descending order, i.e., most recent time stamp first. As can be appreciated by following the remaining triplets in the view description $42_1$ (FIG. 7A), the columns of its corresponding view index $30_1$ (FIG. 3) are described. FIGS. 6B and 7B describe the organization of a different view index (e.g., view index $30_2$, not shown in detail) that contains properties corresponding to other files such as Microsoft Excel spreadsheet files.

As can be seen from FIG. 7A, the view description $42_1$ thus provides a quick way for a query engine to determine if a particular view index is compatible with a query. In addition, the view description $42_1$ serves as the key to a BTree, with the entire six column row used as the key. The sort indicator provides the comparison rule that informs the BTree of the direction to branch to locate data.

Figure 8:
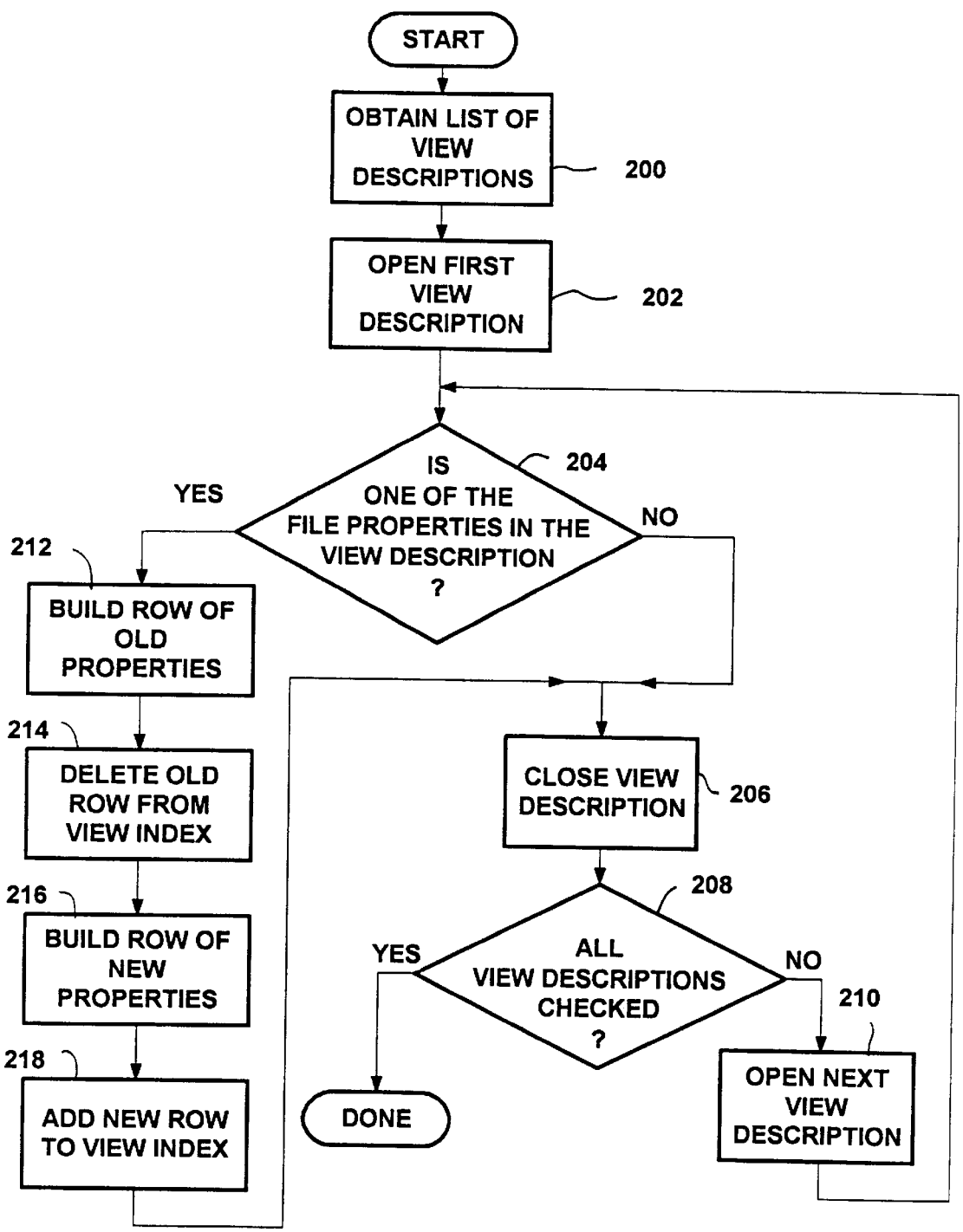
FIG. 8 is a flow diagram illustrating the steps taken to synchronously update view indexes in the file system.

Turning now to an explanation of the operation of the invention, there is first described the process shown in FIG. 8 taken by an application program (e.g. application program 24, of FIG. 1) to update the view index. When an application program that is compatible with view indexes creates or modifies a document, the application program $24_1$ calls the operating system 22 (and thus the file system 26) with a function call named "Set Property Values." As part of this call, the application program $24_1$ provides the document's properties to the file system 26 in the form of a property set name, a property ID and a data value for each property provided. These may be more properties than are in all of the view indexes $30_1$–$30_n$, but as described below, at this time the application program 24, is not aware of which properties are being used in the view indexes $30_1$–$30_n$. When the file system 26 receives the properties sent by the application program $24_1$, the file system 26 stores those properties in a data structure.

As shown in FIG. 8, the set property process first determines at step 200 which view descriptions $42_1$–$42_n$ describe view indexes that contain those properties which were modified or created by the application program $24_1$. If a view description $42_1$–$42_n$ does not contain one of the properties that has been created or modified, there is nothing to update in its associated view index $30_1$–$30_n$ and thus that view index is skipped. Conversely, if the property is in a view index, as identified by a corresponding property set name and property ID in the associated view description, addition or modification of that view index is necessary.

Thus, at step 200 of FIG. 8, the set property process first obtains a list of the view descriptions $42_1$–$42_n$ that correspond to view indexes $30_1$–$30_n$ within the scope of the document (i.e., the associated document is in the directory or in the volume of a view index) created or modified by the application program $24_1$. At step 202, a first view description (e.g. $42_1$) within the scope is opened. At step 204, the set property process compares the properties (set name and ID) provided thereto by the application program $24_1$ to the view description $42_1$ to determine if one of the properties is in the associated view index $30_1$. If none of the properties are in a given view description $42_1$, at step 206 that view description is closed, and at step 208 the process determines if all view descriptions $42_1$–$42_n$ have been checked. If so the process ends; if not, the next view description (e.g., $42_2$) in the list is opened at step 210. The process returns to step 204 to scan the next view description $42_2$ for matching properties.

If at step 204 a property was determined to be present in a view description $42_2$, then it is necessary to add or modify that property in the view description's corresponding view index $30_2$. To this end, old property information, which in the case of an existing file is available to the application program $24_1$, is used to construct a row at step 212 that is formatted according to the row in the view description $42_2$. At step 214, this old row is used as a key to the view index $30_2$ Btree in combination with a command to the BTree interface to delete the row. Note that if the old information is not present, which is what occurs when creating a new document, executing the delete command with null data (if at all) or the like will have no effect since no record in the BTree will match for deletion thereof.

Following the deletion step, at step 216 a new row (such as shown in FIGS. 6B and 7B) is built from the new properties. At step 218 the new row is added to the view index BTree, and the synchronous update is complete.

Analogous to when a file is created, when a file is deleted, there are no adds (or adds with null data) to be performed, only deletes to the view indexes which contain references to that now-deleted file. However, for simplicity hereinafter, adds and deletes will be considered as pairs since this represents the most common case of modifying file properties, although there is no requirement that they be paired with one another.

To eliminate some of the overhead associated with synchronous updating of single view indexes $30_1$–$30_n$, rather than immediately performing the delete row and add row commands, it is feasible to maintain a log of delete row/add row pairs (or similar information in a look-aside table 70, described below) for each view index $30_1$–$30_n$. The log may be applied to the view indexes at some later time. Thus, as shown in step 300 of FIG. 9, one way to accomplish delayed updating is to have the synchronous updating program write the delete and add row pairs to a log rather than command the BTree to directly delete and add the row, i.e., change the function performed at steps 214 and 214 of FIG. 8 from add and delete commands to "Write log" commands. Another way to implement delayed updating is to have the BTree interface intercept the add and delete commands and log the keys rather than immediately apply them.

Figure 9:
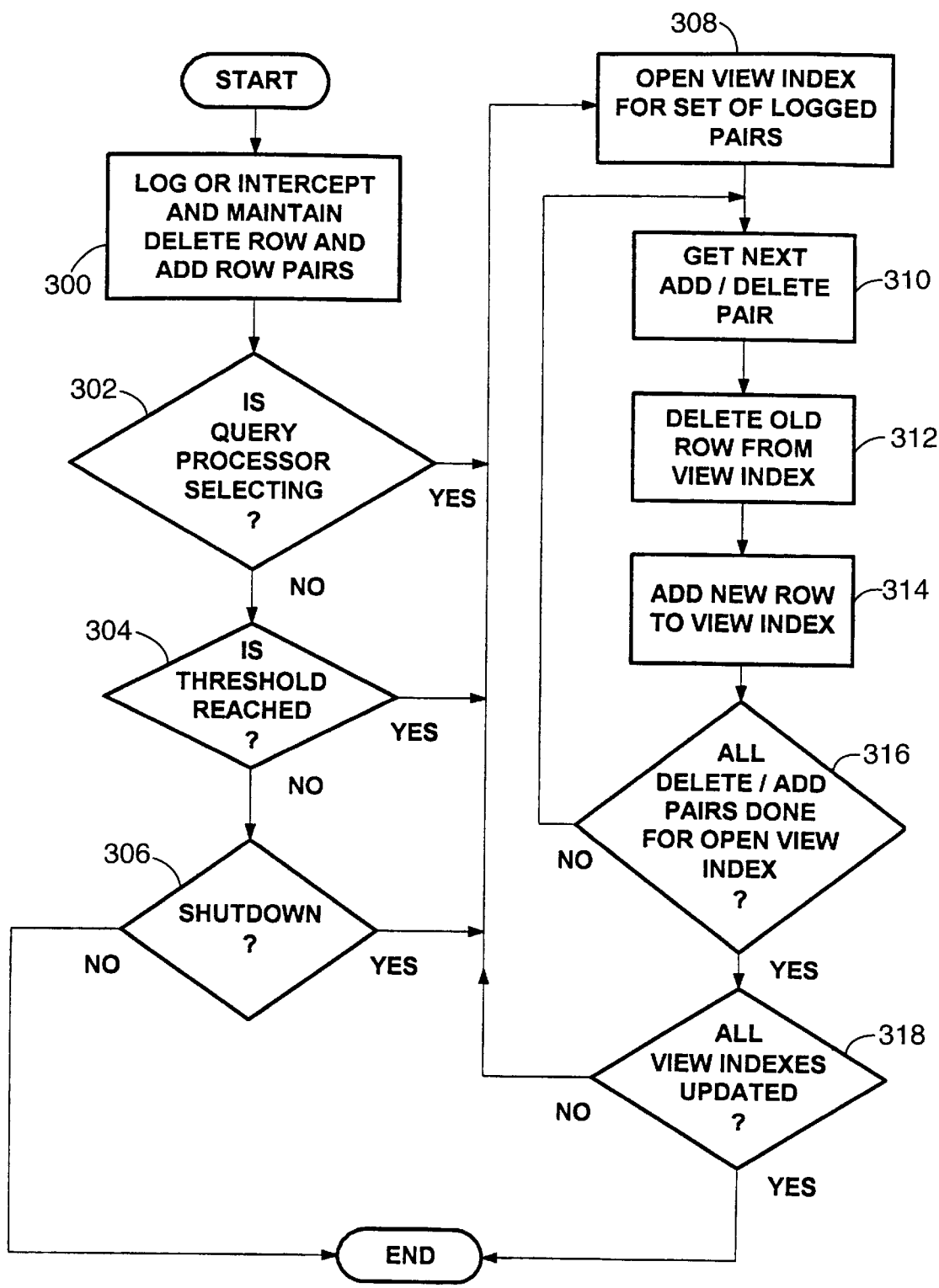
FIG. 9 is a flow diagram illustrating the steps taken to asynchronously update view indexes in the file system in bulk.

In any event, as shown in steps 302–306 of FIG. 9, upon the query process 62 (FIG. 1) preparing to query an index (step 302), or when the log reaches a threshold (step 304, such as an elapsed time duration or a certain number of pairs having been logged), or as part of a shutdown routine of the computer system 20 (step 306), the updating process is activated to make the view indexes current. At step 308 a view index identified for a pair is opened, and at steps 310–314 the deletes and adds are performed on a pairwise basis until all logged pairs are updated in that view index as determined at step 316. At step 318 a test is performed to see if all view indexes have been updated, and if so the process ends, else the next view index is opened at step 308 for updating. Of course, alternative methods of updating the view indexes will also suffice. For example, multiple view indexes may be opened simultaneously with the appropriate add/delete pairs provided thereto. Yet another, more efficient, way in which to update the view indexes using a look-aside table 70 is described below with reference to FIGS. 13A and 13B.

However, application programs developed prior to the present invention will not be able to utilize the above-described set property call. Accordingly, to make the process extensible to virtually any document, a daemon process 60 (FIG. 1) is preferably employed to extract the properties from documents and make the set property call on their behalf.

Figure 10:
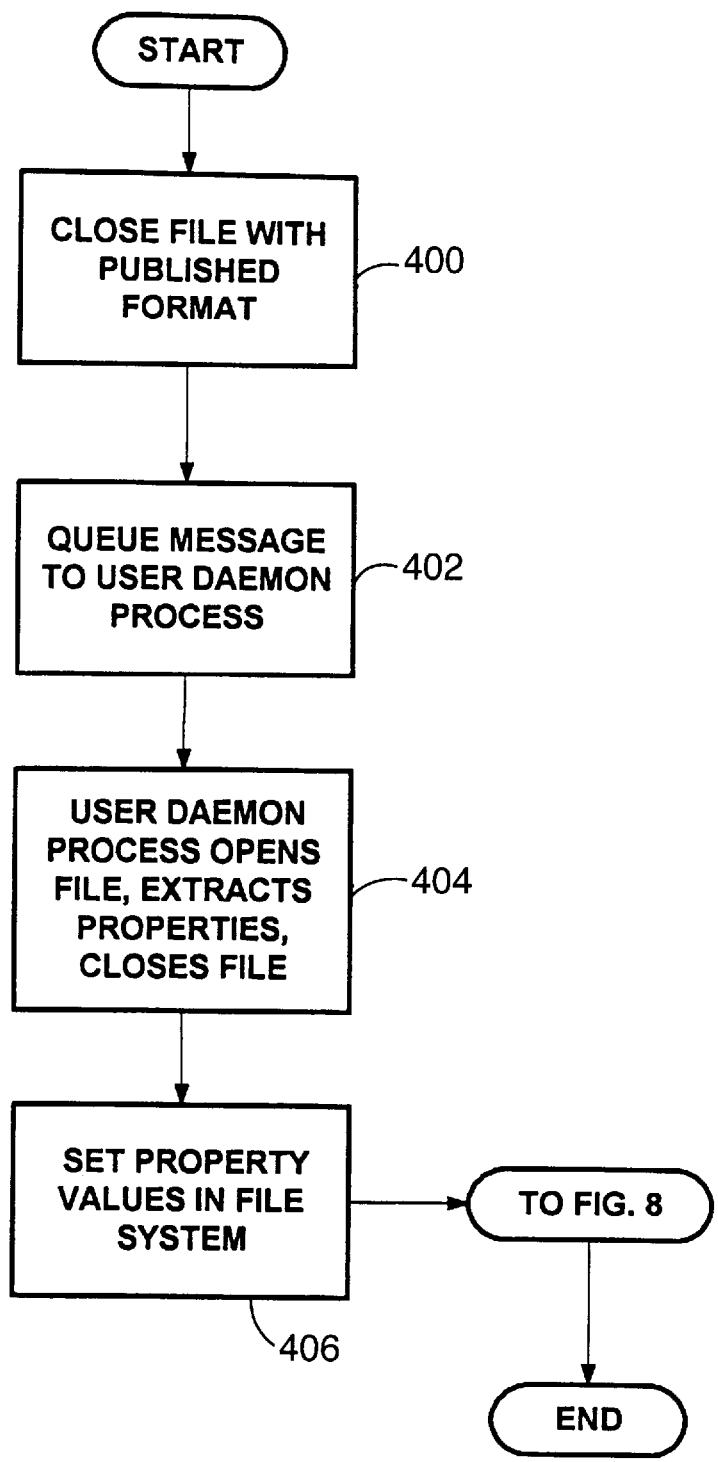
FIG. 10 is a flow diagram illustrating the steps taken to update view indexes in the file system independent of an application program call.

As shown in FIG. 10, whenever a file with a published format is closed (released) at step 400 by an application program (e.g., 24$_2$) without the set property process having been called for that file, the operating system 22 queues a message at step 402 to the user daemon process 60. At an appropriate time, which may be immediately upon receiving the message, the daemon process 60 opens the file at step 404 and extracts the properties from that file according to the published format for that type of file. The daemon process 60 makes the set property call to the operating system 22 at step 406, and the operating system 22 in turn executes the set property process as described above with reference to FIG. 8. Of course, the asynchronous updating steps as described above with respect to FIG. 9 and/or described below with respect to FIGS. 13A and 13B may also be performed. A daemon process that extracts file properties is described in U.S. patent application Ser. No. 08/329,810, assigned to the assignee of the present application and herein incorporated by reference in its entirety.

In the instance where a new view index is created, it is desirable to populate the new view index with the properties stored in existing documents. A daemon program is provided to interrogate all appropriate documents to determine if the properties in that document are to be maintained by the new view index. If so, the properties are extracted and the set property call is made to place the properties in the view index as described above. If the document does not have the corresponding properties, the daemon process continues until all documents have been interrogated, at which time the view index is fully current.

Turning to an explanation of an operation of the invention when a query is received, the view descriptions are examined to determine if one describes a view index having a compatible sort order. Since it is intended that view indexes will be custom built by the user for the user's most frequent queries, it is anticipated that such a match will often be found.

Figure 11:
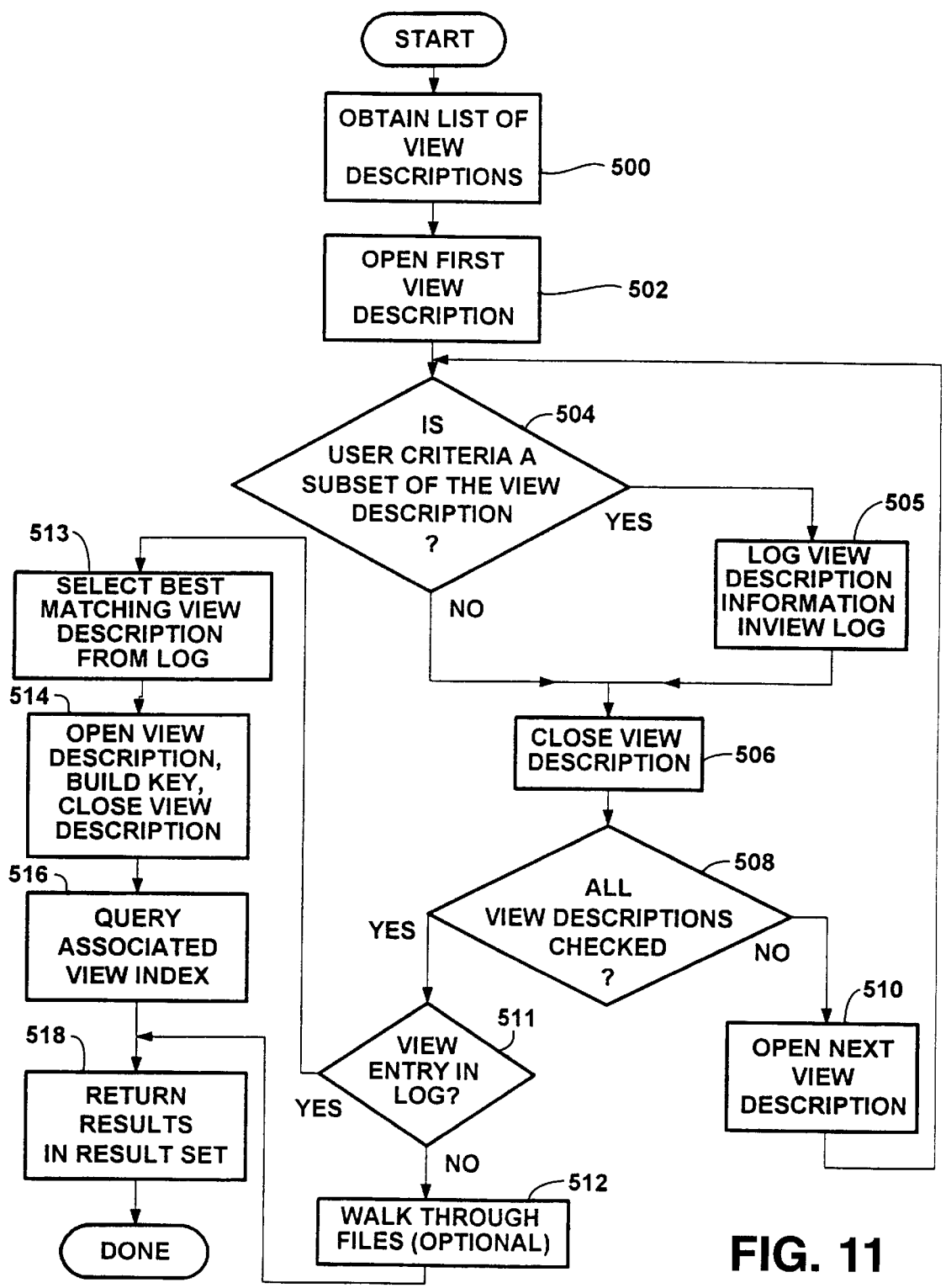
FIG. 11 is a flow diagram illustrating the steps taken by a query engine when processing a query.

As shown in FIG. 11, at step 500 the query processor 62 initially obtains a list of view descriptions 42$_1$–42$_n$ from the file system 26 that will fulfill the scope (volume or directory) of the search. Note that any updates (see FIG. 9) are done at this time to ensure that the view indexes are all current. In any event, at step 502 the query process 62 opens a first view description (e.g., 40$_1$). Based upon the selection criteria provided by the user, the query process 62 checks the view description 40$_1$ at step 504 to see if the search criteria is compatible with a subset of properties (or the full set) that is maintained in the proper order in that view description's associated view index 30$_1$. If the opened view description 40$_1$ describes a compatible sort order, that view description

40$_1$ is logged at step 505 for possible use as described below, and then closed at step 506. If the opened view description 40$_1$ does not describe a compatible sort order, that view description 40$_1$ is directly closed at step 506. A comparison is then performed at step 508 to determine if all possible view descriptions in the list have been checked. If not, the next view description is opened at step 510 and the query process returns to step 504 to check the criteria against the next description, e.g., 40$_2$.

Once all view descriptions have been checked (step 504) as determined at step 508, a comparison is made at step 511 to determine if at least one had a compatible sort order. If at least one view description is entered in the log, the process branches to step 513 where the best matching view description is selected from the log. Note that it is alternatively feasible in each iteration to compare the opened view description against any previous best-matching description, such that only one, best matching, view description identity is actually maintained. In such an instance, the best matching view description may, if desired, be left open rather than closed at step 506, while the lesser matching view description is closed. In any event, provided at least one view description matched the criteria, the best matching view description is identified prior to the process continuing at step 514.

Once the best matching view description has been selected at step 513, then at step 514 the selected view description is opened, (if not already left open as described above), the row described in the view description is used to build a key to the BTree index, and then the selected view description is closed. At step 516, the associated view index BTree is opened for read only access by the query processor and is queried. The result set is rapidly obtained in the sorted order by providing a read command to the BTree index, and the result set is returned to the user at step 518.

Note that if all view descriptions were checked at step 508 and no compatible view existed, then the query processor 62 can optionally walk through the files in the conventional manner (step 512), or alternatively return a message to the user indicating the inability to find a compatible view. Note that in another alternative, a prompt providing the user with the option of walking through the files or re-entering the query may be desirable, because the query may have been incorrectly entered.

Lastly, for asynchronous (bulk) updating, rather than maintain a log of all changes to properties for each view index, it is desirable to maintain a log of only the most recent file change information. For example, a file may be changed a number of times between updates to the view indexes. Instead of writing the intermediate states to the view index and/or an add/delete log, and thereafter overwriting that information with the more recent information, only the most recent information is extracted and written.

To this end, in one preferred embodiment of the invention, a look-aside table 70 (FIG. 12) is maintained for each view index. The look-aside table 70 corresponds to a given view index and contains the filenames of files (objects) with properties in that view index which have undergone a status change, i.e., have been newly created, have had properties modified, or have been deleted. As shown in FIG. 12, the look-aside table 70 maintains the status information (update, delete or new) in association with the filename each time a file changes.

The look-aside table 70 further maintains data for certain of the entries. However, for optimization purposes, to reduce writes to the view index, each property for each file appears only once in the log regardless of how many times the property is modified. Thus, when information is logged in the look-aside table, existing information is overwritten rather than added to the end of the table. Also, for optimization purposes, if a file is newly created and then deleted before a view index update, it will be completely removed from the table 70.

Whenever a file is deleted, a list of the deleted properties, along with the previous values thereof those properties is maintained by the look-aside table 70. This enables the deleted entries to be removed from the view index (via a key) during asynchronous updating of the view index, as described below. For modified files, a list of the original properties (as stored in the BTree view index) is maintained in table 70 whenever a modified file is closed. Lastly, for newly created files, no property data is maintained, the reason for which will become apparent below.

Figure 13A:
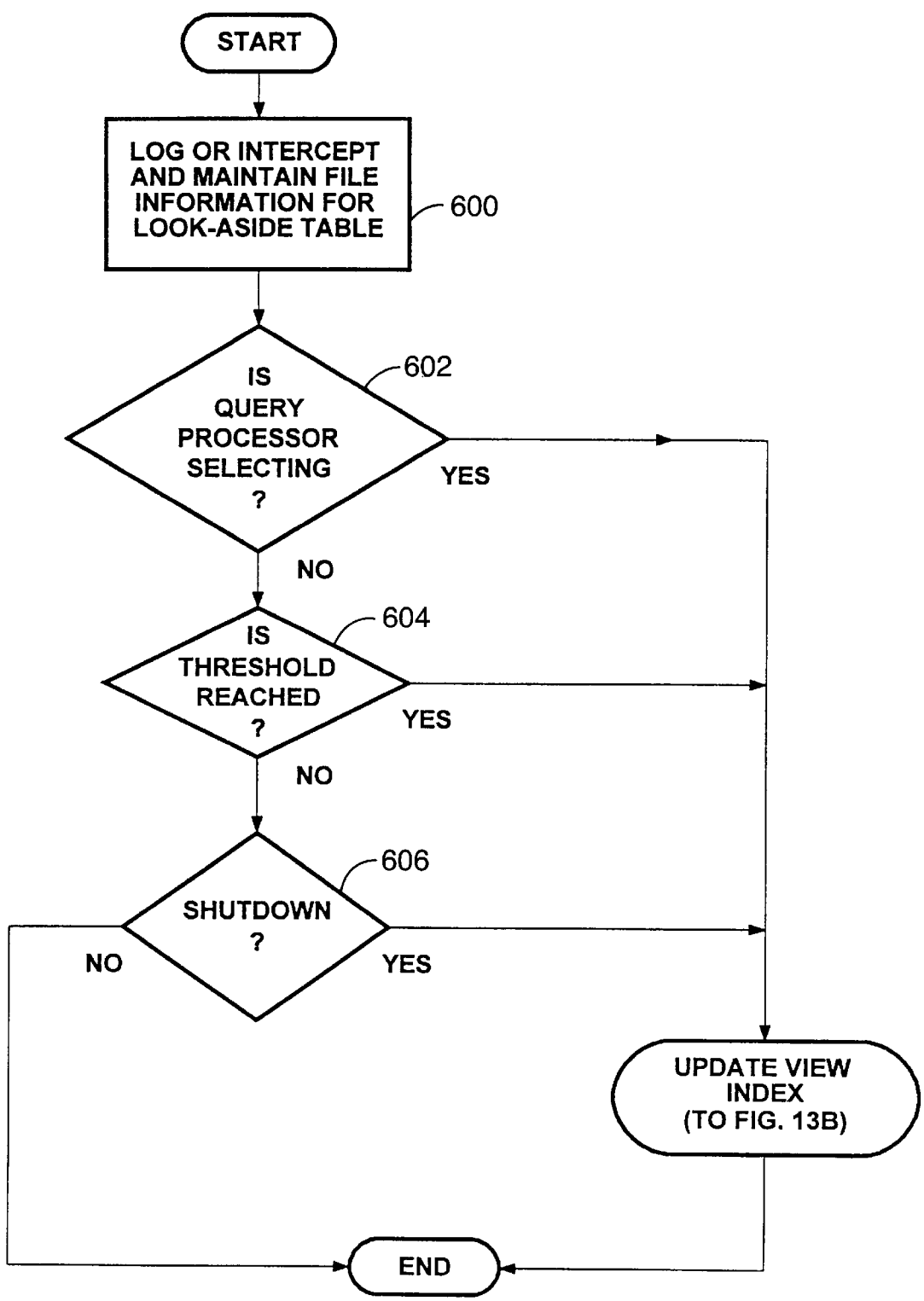
FIGS. 13A–13B comprise a flow diagram illustrating an efficient process for asynchronously updating view indexes in the file system in bulk.
Figure 13B:
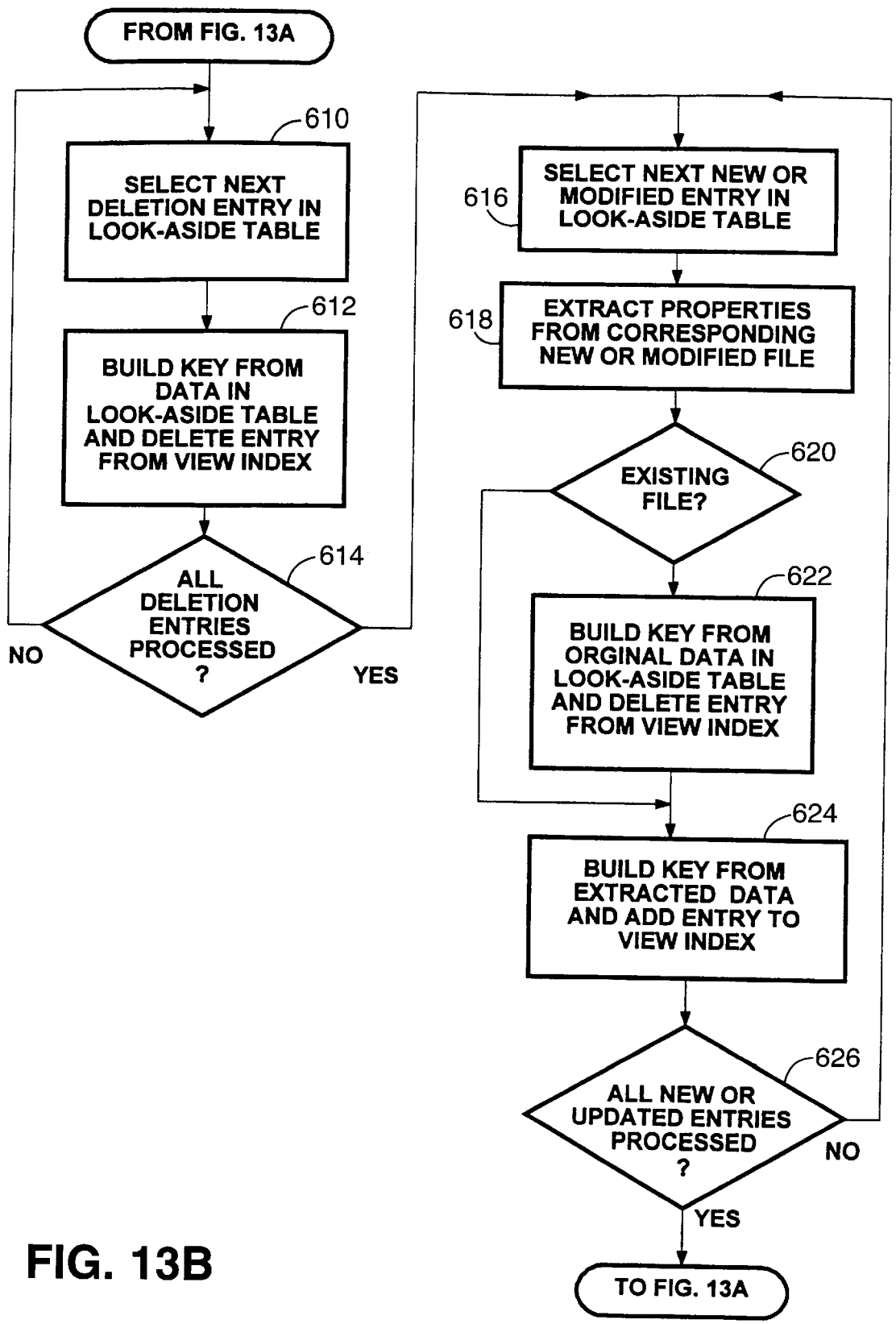

As shown in FIGS. 13A–13B, the look-aside table 70 is utilized to update the view index. Upon an affirmative decision to update at any of steps 602, 604 or 606, the updating begins as shown in step 610 of FIG. 13B.

As shown in step 610 of FIG. 13B, all deletion entries are processed first. To delete an entry, at step 612 a key to the BTree is built from the property information maintained in the look-aside table 70 for each deletion entry. The key is then used to delete the entry in the above-described manner. Deletion continues at step 614 until all deletions are processed, whereby control passes to step 616.

At step 616, the process for updating the view index with each newly created or modified (existing) file is executed, wherein a file (new or existing) is selected from the look-aside table. At step 618, the most recent properties of that file are extracted from the new or existing file. Since no existing information exists for a new file, there is no existing property data to delete from the BTree view index therefor, so, as determined at step 620, for new files the process continues to step 624.

However, for existing files, at step 622, a key is built containing the original data, as maintained in the look-aside table 70. This allows the original property data to be removed from the BTree for replacing with the most recent property data. Note that it is alternatively possible to accomplish this deletion at steps 610–614 by first treating a modified file as both a deleted file and then later as a newly created file. In any event, after the delete, control passes to step 624.

At step 624, for both new or existing files, a key is built from the data extracted at step 618. The property data is then inserted into the view index BTree using this key as described above. The process continues until all new or modified files have been processed as determined at step 626. After the updating, the look-aside table is cleared of entries and rebuilt as files undergo status changes, until the next view index update.

As can be seen from the foregoing detailed description, there is provided a system and method for rapidly providing a sorted result set of files in response to a query. The system and method functions desirably with a dynamically changing set of files, and is maintained up-to-date for files in the file system without depending on user commands. The sorted result sets are customizable, and the system and method is extensible to virtually any types of files regardless of the format of the files and/or the program that creates and utilizes those files.

What is claimed is:

1. In a computer system, a mechanism for returning a sorted result of information corresponding to files in a file system that have properties which match user query criteria, comprising, a view index having a plurality of files represented therein sorted by at least one property common to those files, a view description associated with the view index, the view description including information representative of the organization of the properties in the view index, means for receiving a query requesting a result set, the query including query criteria corresponding to properties of files in the file system, a comparison routine for comparing the view index with the query criteria to determine if the properties in the view index are stored in an order that corresponds to the query criteria, means associated with the comparison routine for reading the view index to locate information of files that have properties with match user query criteria if the properties in the view index are stored in an order that corresponds to the query criteria, and means for returning the result set identifying the located files, wherein the properties are selected from a group consisting of a file name, an author identification and a time stamp.

2. The mechanism of claim 1 wherein the at least one property is identified in a properties data structure within the view description.

3. The mechanism of claim 1 wherein the view description includes a scope definition.

* * * * *

UNITED STATES PATENT AND TRADEMARK OFFICE
CERTIFICATE OF CORRECTION

PATENT NO. : 5,878,410
DATED : March 2, 1999
INVENTOR(S) : Mark J. Zbikowski; Brian T. Berkowitz; Kyle G. Peltonen It is certified that errors appear in the above-identified patent and that said Letters Patent is hereby corrected as shown below:

In Column 7, line 37: "24," should read --$24_1$--

In Column 7, line 47: "24," should read --$24_1$--

Signed and Sealed this

Twenty-eighth Day of November, 2000

Attest:

Q. TODD DICKINSON

Attesting Officer

Director of Patents and Trademarks